US012770088B2

(12) United States Patent
Oi et al.

(10) Patent No.: US 12,770,088 B2
(45) Date of Patent: Oct. 20, 2026

(54) PROCESSING APPARATUS, PROCESSING METHOD, AND NON-TRANSITORY STORAGE MEDIUM

(71) Applicant: NEC Corporation, Tokyo (JP)

(72) Inventors: Norihito Oi, Tokyo (JP); Tooru Iwamoto, Tokyo (JP); Takuroh Kashima, Tokyo (JP); Tomoaki Makino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 136 days.

(21) Appl. No.: 18/727,140

(22) PCT Filed: Jan. 18, 2022

(86) PCT No.: PCT/JP2022/001607
§ 371 (c)(1),
(2) Date: Jul. 8, 2024

(87) PCT Pub. No.: WO2023/139647
PCT Pub. Date: Jul. 27, 2023

(65) Prior Publication Data
US 2025/0156795 A1 May 15, 2025

(51) Int. Cl.
*G06Q 10/083* (2024.01)
*G06Q 10/0631* (2023.01)
*G07C 5/02* (2006.01)

(52) U.S. Cl.
CPC ..... *G06Q 10/083* (2013.01); *G06Q 10/06315* (2013.01); *G07C 5/02* (2013.01)

(58) Field of Classification Search
CPC ........... G06Q 10/083; G06Q 10/06315; G06Q 10/04; G06Q 10/08; G07C 5/02
See application file for complete search history.

(56) References Cited

U.S. PATENT DOCUMENTS 11,567,503 B1 * 1/2023 Roy ........................ G05D 1/028
2008/0319597 A1 * 12/2008 Yamada ................... B60K 6/46
701/22

(Continued)

FOREIGN PATENT DOCUMENTS

JP 2003-111209 A 4/2003
JP 2017-513006 A 5/2017

(Continued)

OTHER PUBLICATIONS

International Search Report for PCT Application No. PCT/JP2022/001607, mailed on Apr. 19, 2022.

*Primary Examiner* — Kyle J Kingsland
(74) *Attorney, Agent, or Firm* — Sughrue Mion, PLLC

(57) ABSTRACT

The present invention provides a processing apparatus (10) including a prediction information acquisition unit (11) that acquires remaining-fuel-amount prediction information indicating a change in a predicted value of a remaining amount of fuel in a vehicle while traveling based on a transport plan is performed and being produced based on a prediction model, an actual measurement information acquisition unit (12) that acquires remaining-fuel-amount actual measurement information indicating a change in an actual measurement value of a remaining amount of fuel in the vehicle while traveling based on the transport plan is performed, and a determination unit (13) that determines, based on the remaining-fuel-amount prediction information and the remaining-fuel-amount actual measurement information, whether correction of the prediction model is necessary.

16 Claims, 11 Drawing Sheets

(56) References Cited

U.S. PATENT DOCUMENTS

| | | | | |
|---|---|---|---|---|
| 2017/0030728 | A1 | 2/2017 | Baglino et al. | |
| 2020/0050954 | A1 | 2/2020 | Fukushima et al. | |
| 2020/0393259 | A1 | 12/2020 | Gantt, Jr. et al. | |
| 2021/0138927 | A1 | 5/2021 | Maeng et al. | |
| 2023/0118287 | A1* | 4/2023 | Bruneau | B62J 43/10<br>701/32.1 |

FOREIGN PATENT DOCUMENTS

| | | | |
|---|---|---|---|
| JP | 2020-027432 | A | 2/2020 |
| JP | 2020-095315 | A | 6/2020 |

* cited by examiner

FIG. 4

| TIME | SOC |
|---|---|
| 9:00 | 85 |
| 9:30 | 80 |
| ⋮ | ⋮ |

FIG. 7

TRANSPORT PLAN LIST (NOVEMBER 19, 2021)

| PLAN IDENTIFI-CATION INFOR-MATION | VEHICLE IDENTIFI-CATION INFOR-MATION | TRANSPORT INFORMATION | | | | | | | | BASE DEPAR-TURE TIME | ... |
|---|---|---|---|---|---|---|---|---|---|---|---|
| | | ORDER | TRANSPORT DESTINATION | CLASSIFI-CATION | WORK TIME | PACKAGE WEIGHT | WORK START TIME | WORK END TIME | ... | | |
| 0001 | V001 | 1 | OO COMPANY ... TOKYO | DELIVERY | 20 MINUTES | 25.6kg | 8:25 | 8:45 | ... | 8:15 | ... |
| | | 2 | ×× COMPANY | DELIVERY | 20 MINUTES | 12.8kg | 9:05 | 9:25 | ... | | |
| | | ... | ... | ... | ... | ... | ... | ... | ... | | |
| ... | ... | ... | ... | ... | ... | ... | ... | ... | ... | ... | ... |

FIG. 8

(ELECTRICITY CONSUMPTION)
=(FIRST PARAMETER)×(FIRST COEFFICIENT)+(SECOND PARAMETER)×(SECOND COEFFICIENT)+…

PROCESSING APPARATUS, PROCESSING METHOD, AND NON-TRANSITORY STORAGE MEDIUM

This application is a National Stage Entry of PCT/JP2022/001607 filed on Jan. 18, 2022, the contents of all of which are incorporated herein by reference, in their entirety.

TECHNICAL FIELD

The present invention relates to a processing apparatus, a processing method, and a program.

BACKGROUND ART

Patent Document 1 discloses a technique for performing evaluation of a delivery plan, based on a desired time for each delivery destination indicated in the delivery plan, an actual result time while delivery based on the delivery plan is performed, quality of driving of a delivery person, and the like.

Patent Document 2 discloses a technique for deriving a change in a predicted value of state of charge (SOC) up to a destination.

RELATED DOCUMENT

Patent Document

Patent Document 1: Japanese Patent Application Publication No. 2020-095315

Patent Document 2: Japanese Patent Application Publication No. 2003-111209

DISCLOSURE OF THE INVENTION

Technical Problem

It is required to produce a transport plan in such a way that a vehicle does not run out of fuel during transport (delivery/collection) using the vehicle. In order to achieve this, it is necessary to accurately estimate a change in a remaining amount of fuel in the vehicle while where traveling based on the transport plan is performed.

An example object of the present invention is to provide a technique for accurately estimating a change in a remaining amount of fuel in a vehicle while traveling based on a transport plan is performed.

Solution to Problem

An example aspect of the present invention provides a processing apparatus including:

- a prediction information acquisition unit that acquires remaining-fuel-amount prediction information indicating a change in a predicted value of a remaining amount of fuel in a vehicle while traveling based on a transport plan is performed and being produced based on a prediction model;
- an actual measurement information acquisition unit that acquires remaining-fuel-amount actual measurement information indicating a change in an actual measurement value of a remaining amount of fuel in the vehicle while traveling based on the transport plan is performed; and
- a determination unit that determines, based on the remaining-fuel-amount prediction information and the remaining-fuel-amount actual measurement information, whether correction of the prediction model is necessary.

Moreover, an example aspect of the present invention provides a processing method of executing, by a computer:

- a prediction information acquisition step of acquiring remaining-fuel-amount prediction information indicating a change in a predicted value of a remaining amount of fuel in a vehicle while traveling based on a transport plan is performed and being produced based on a prediction model;
- an actual measurement information acquisition step of acquiring remaining-fuel-amount actual measurement information indicating a change in an actual measurement value of a remaining amount of fuel in the vehicle while traveling based on the transport plan is performed; and
- a determination step of determining, based on the remaining-fuel-amount prediction information and the remaining-fuel-amount actual measurement information, whether correction of the prediction model is necessary.

Moreover, an example aspect of the present invention provides a program causing a computer to function as:

- a prediction information acquisition unit that acquires remaining-fuel-amount prediction information indicating a change in a predicted value of a remaining amount of fuel in a vehicle while traveling based on a transport plan is performed and being produced based on a prediction model;
- an actual measurement information acquisition unit that acquires remaining-fuel-amount actual measurement information indicating a change in an actual measurement value of a remaining amount of fuel in the vehicle while traveling based on the transport plan is performed; and
- a determination unit that determines, based on the remaining-fuel-amount prediction information and the remaining-fuel-amount actual measurement information, whether correction of the prediction model is necessary.

Advantageous Effects of Invention

According to an example aspect of the present invention, it becomes possible to accurately estimate a change in a remaining amount of fuel in a vehicle while traveling based on a transport plan is performed.

BRIEF DESCRIPTION OF THE DRAWINGS

FIG. 4 is a diagram schematically illustrating one example of prediction information.

FIG. 7 is a diagram schematically illustrating one example of a transport plan.

FIG. 8 is a diagram illustrating one example of a prediction model.

DESCRIPTION OF EMBODIMENTS

Hereinafter, example embodiments of the present invention are described by use of the drawings. Note that, a similar reference sign is assigned to a similar component in all the drawings, and description is omitted as appropriate. “Transport” in the present specification is a concept including both delivering a package to a transport destination and collecting a package at the transport destination.

First Example Embodiment

“Outline”

A processing apparatus according to the present example embodiment has a function of determining whether correction of “a prediction model for predicting a change in a remaining amount of fuel in a vehicle while traveling based on a transport plan is performed” is necessary.

More specifically, the processing apparatus determines, based on remaining-fuel-amount prediction information and remaining-fuel-amount actual measurement information, whether correction of the prediction model is necessary. The remaining-fuel-amount prediction information is information produced based on the prediction model described above, and indicates a change in a predicted value of a remaining amount of fuel in a vehicle while traveling based on a transport plan is performed. The remaining-fuel-amount prediction information indicates a change in an actual measurement value of a remaining amount of the fuel in the vehicle while traveling based on the transport plan is performed.

According to the processing apparatus that determines whether correction of the prediction model is necessary based on such remaining-fuel-amount prediction information and remaining-fuel-amount actual measurement information, whether correction of the prediction model is necessary can be accurately determined. As a result, the prediction model can be corrected in a case where it is truly necessary, and prediction accuracy by the prediction model is improved. Moreover, by correcting the prediction model to non-necessity in a case where it is not necessary, a disadvantage that prediction accuracy by the prediction model deteriorates can be suppressed.

“Hardware Configuration”

Next, one example of a hardware configuration of a processing apparatus is described. Each functional unit of the processing apparatus is achieved by any combination of hardware and software mainly including a central processing unit (CPU) of any computer, a memory, a program loaded onto the memory, a storage unit such as a hard disk that stores the program (that can store not only a program previously stored from a phase of shipping an apparatus but also a program downloaded from a storage medium such as a compact disc (CD) or a server or the like on the Internet), and an interface for network connection. Then, it is appreciated by a person skilled in the art that there are a variety of modified examples of a method and an apparatus for the achievement.

Figure 1:
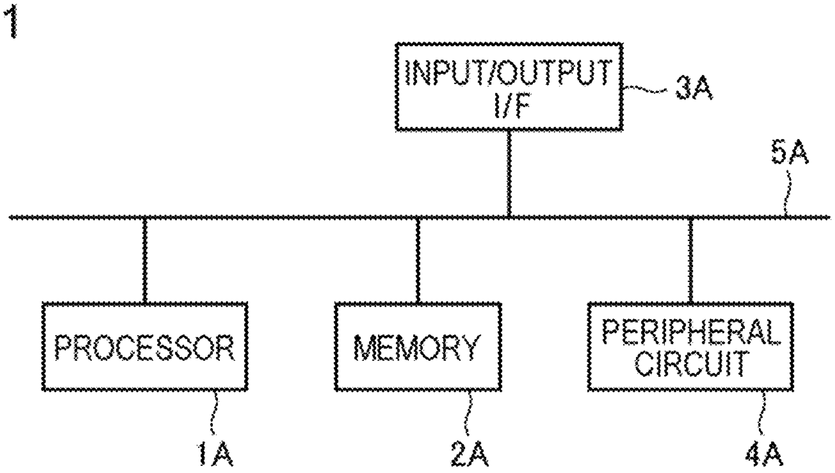
FIG. 1 is a diagram illustrating one example of a hardware configuration of a processing apparatus.

FIG. 1 is a block diagram illustrating a hardware configuration of the processing apparatus. As illustrated in FIG. 1, the processing apparatus includes a processor TA, a memory 2A, an input/output interface 3A, a peripheral circuit 4A, and a bus 5A. The peripheral circuit 4A includes various modules. The processing apparatus may not include the peripheral circuit 4A. Note that, the processing apparatus may be configured by a plurality of physically and/or logically separated apparatuses. In this case, each of the plurality of apparatuses can include the hardware configuration described above.

The bus 5A is a data transmission path for the processor TA, the memory 2A, the peripheral circuit 4A, and the input/output interface 3A to mutually transmit and receive data. The processor 1A is, for example, an arithmetic processing apparatus such as a CPU or a graphics processing unit (GPU). The memory 2A is, for example, a memory such as a random access memory (RAM) or a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, or the like. The processor TA can give an instruction to each of modules, and perform an arithmetic operation, based on an arithmetic result of each of the modules.

“Function configuration”

Figure 2:
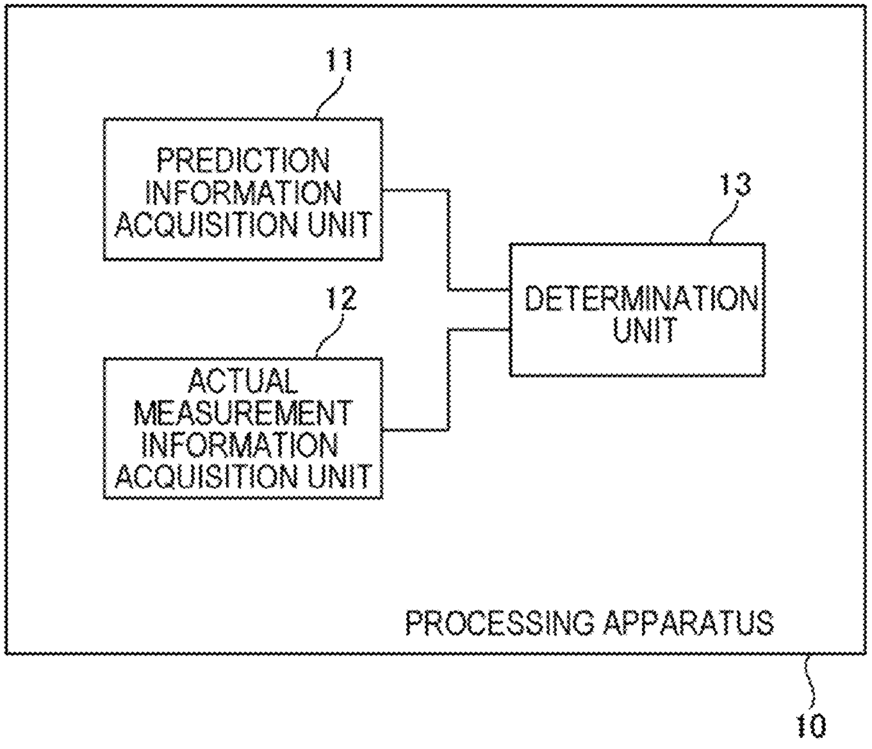
FIG. 2 is a diagram illustrating one example of a functional block diagram of the processing apparatus.

Next, the functional configuration of the processing apparatus is described. FIG. 2 illustrates one example of a functional block diagram of a processing apparatus 10. As illustrated in the figure, the processing apparatus 10 includes a prediction information acquisition unit 11, an actual measurement information acquisition unit 12, and a determination unit 13.

The prediction information acquisition unit 11 acquires remaining-fuel-amount prediction information indicating a change in a predicted value of a remaining amount of fuel in a vehicle while traveling based on a transport plan is performed. The remaining-fuel-amount prediction information is information produced based on a previously produced prediction model. The prediction information acquisition unit 11 may acquire the remaining-fuel-amount prediction information by accepting input of the remaining-fuel-amount prediction information. Otherwise, the prediction information acquisition unit 11 may produce remaining-fuel-amount prediction information based on a transport plan.

A “vehicle” according to the present example embodiment is a so-called electric vehicle that is driven by electricity as fuel. Then, “remaining-fuel-amount prediction information” according to the present example embodiment indicates a change in a predicted value of SOC. As a modified example, a vehicle may be a vehicle driven by another fuel such as gasoline, light oil, or hydrogen, and the remaining-fuel-amount prediction information may indicate a change in a predicted value of remaining amounts of the fuels. Even if a vehicle is a vehicle according to the modified examples, a similar advantageous effect is achieved by processing similar to processing described below. Note that, a “vehicle” referred to below means an electric vehicle unless otherwise specified.

Figure 3:
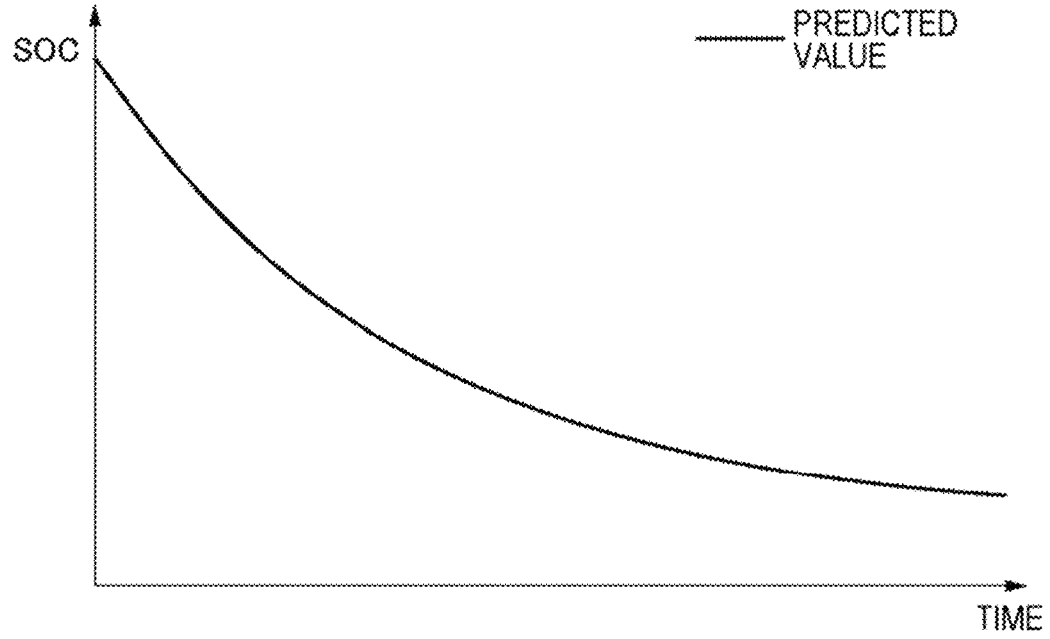
FIG. 3 is a diagram schematically illustrating one example of prediction information.

FIG. 3 illustrates one example of remaining-fuel-amount prediction information. The remaining-fuel-amount prediction information illustrated in the figure indicates a predicted value of SOC at any timing from departure from a base to return to the base. FIG. 4 illustrates another example of remaining-fuel-amount prediction information. The remaining-fuel-amount prediction information illustrated in the figure indicates a predicted value of SOC at a predetermined timing from departure from a base to return to the base. For example, a predicted value of SOC every 30 minutes may be indicated as illustrated, or a time interval may be different from the illustrated example. Moreover, the time interval may be shortened as a predicted value of SOC becomes smaller.

In the present example embodiment, a configuration of a prediction model and details of how to produce remaining-fuel-amount prediction information are not particularly limited, and any configuration can be adopted. One example is described in the following example embodiment.

Returning to FIG. 2, the actual measurement information acquisition unit 12 acquires remaining-fuel-amount actual measurement information indicating a change in an actual measurement value of SOC of a vehicle while traveling based on a transport plan is performed. The actual measurement information acquisition unit 12 acquires remaining-fuel-amount prediction information indicating a change in SOC detected by an in-vehicle apparatus installed in the vehicle. The actual measurement information acquisition unit 12 may acquire remaining-fuel-amount actual measurement information by communicating with the in-vehicle apparatus, may acquire remaining-fuel-amount actual measurement information by communicating with the in-vehicle apparatus and communicating with a management apparatus that collects and manages remaining-fuel-amount actual measurement information of the vehicle, and acquire remaining-fuel-amount actual measurement information input by user operation.

The determination unit 13 determines, based on the remaining-fuel-amount prediction information and the remaining-fuel-amount actual measurement information, whether correction of a prediction model utilized for production of the remaining-fuel-amount prediction information is necessary. The determination unit 13 determines that correction of a prediction model is necessary in a case where the remaining-fuel-amount prediction information and the remaining-fuel-amount actual measurement information deviate from each other by equal to or more than a first criterion level.

There are various conditions for determining "deviate by equal to or more than the first criterion level", but, for example, one of conditions 1 to 3 below may be included.

(Condition 1) There exists a place where a difference d (see FIG. 5) between a predicted value indicated by remaining-fuel-amount prediction information and an actual measurement value indicated by remaining-fuel-amount actual measurement information is equal to or more than a first criterion value.

(Condition 2) An integrated value of a time at which the difference d (see FIG. 5) between a predicted value indicated by remaining-fuel-amount prediction information and an actual measurement value indicated by remaining-fuel-amount actual measurement information becomes equal to or more than the first criterion value is equal to or more than a second criterion value.

(Condition 3) There is a time period during which a time length in which a state where the difference d (see FIG. 5) between a predicted value indicated by remaining-fuel-amount prediction information and an actual measurement value indicated by remaining-fuel-amount actual measurement information becomes equal to or more than the first criterion value continues becomes equal to or more than a third criterion value.

Figure 5:
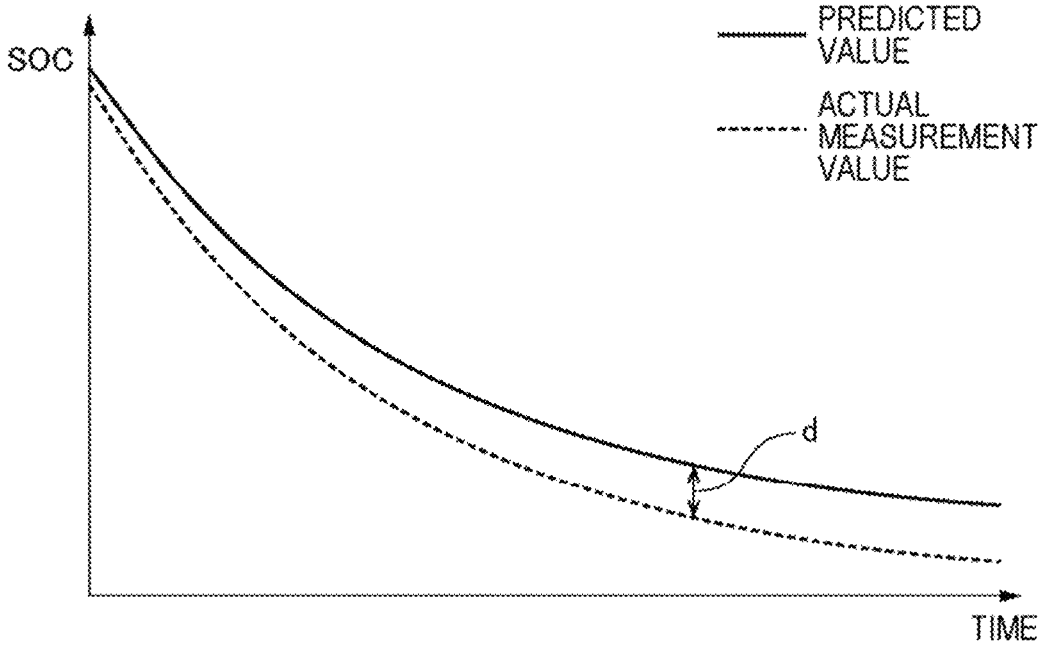
FIG. 5 is a diagram for describing a difference between a predicted value and an actual measurement value.

Note that, as illustrated in FIG. 5, the difference d is a difference between a predicted value of SOC of a vehicle at a certain timing while traveling based on a transport plan is performed and an actual measurement value of SOC of the vehicle at the timing while traveling based on the transport plan is performed.

Figure 6:
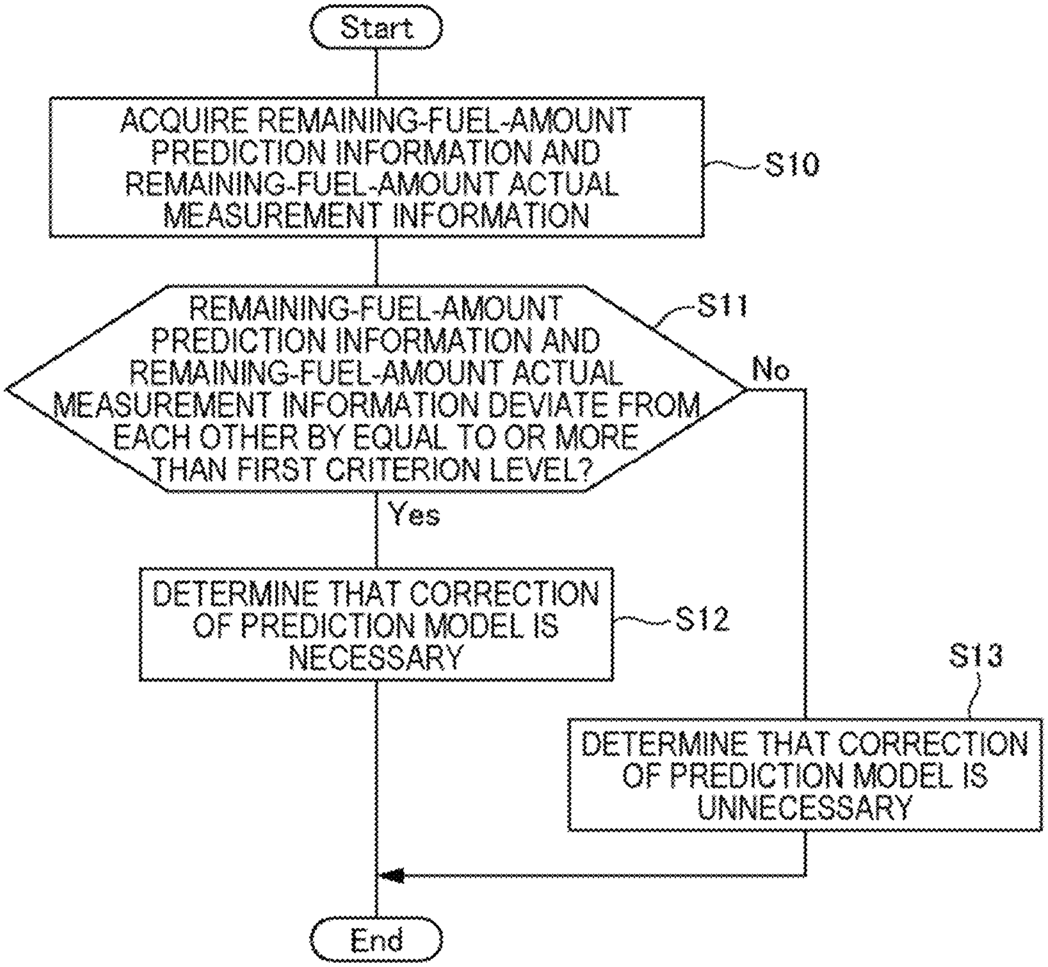
FIG. 6 is a flowchart illustrating one example of a flow of processing of the processing apparatus.

Next, one example of a flow of processing of the processing apparatus 10 is described by use of a flowchart in FIG. 6.

First, the processing apparatus 10 acquires remaining-fuel-amount prediction information and remaining-fuel-amount actual measurement information (S10). The remaining-fuel-amount prediction information is information produced based on a prediction model, and indicates a change in a predicted value of SOC of the vehicle while traveling based on the transport plan is performed. The remaining-fuel-amount actual measurement information indicates a change in an actual measurement value of SOC of the vehicle while traveling based on the transport plan is performed.

Next, the processing apparatus 10 determines whether the remaining-fuel-amount prediction information and the remaining-fuel-amount actual measurement information deviate from each other by equal to or more than a first criterion level (S11). In a case where the remaining-fuel-amount prediction information and the remaining-fuel-amount actual measurement information deviate from each other by equal to or more than the first criterion level (Yes in S11), the processing apparatus 10 determines that correction of the prediction model is necessary (S12). On the other hand, in a case where the remaining-fuel-amount prediction information and the remaining-fuel-amount actual measurement information do not deviate from each other by equal to or more than the first criterion level (No in S11), the processing apparatus 10 determines that correction of the prediction model is unnecessary (S13).

The processing apparatus 10 may output determination results in S12 and S13 via any output apparatus. An output apparatus is exemplified by a display, a projection apparatus, a speaker, a warning lamp, a printer, a mailer, or the like, but is not limited thereto.

Advantageous Effect

The processing apparatus 10 according to the present example embodiment can determine, based on remaining-fuel-amount prediction information and remaining-fuel-amount actual measurement information, whether correction of a prediction model utilized for production of the remaining-fuel-amount prediction information is necessary. According to the processing apparatus 10 as described above, whether correction of the prediction model is necessary can be accurately determined. As a result, a prediction model can be corrected in a case where it is truly necessary, and prediction accuracy by the prediction model is improved. Moreover, by correcting the prediction model to non-necessity in a case where it is not necessary, a disadvantage that prediction accuracy by the prediction model deteriorates can be suppressed.

Second Example Embodiment

In the present example embodiment, production processing of remaining-fuel-amount prediction information described in the first example embodiment is embodied. Remaining-fuel-amount prediction information is produced based on a transport plan and a prediction model. Hereinafter, the transport plan and the prediction model are described in this order, and then, production processing of remaining-fuel-amount prediction information using the transport plan and the prediction model is described.

"Transport Plan"

Initially, a transport plan is described. The transport plan indicates a transport destination, a transport order, a weight of a package, and the like.

FIG. 7 schematically illustrates one example of a transport plan. In FIG. 7, a plurality of delivery plans for Nov. 19, 2021 are listed. In FIG. 7, plan identification information, vehicle identification information, transport information, and a base departure time are associated with each other. Note that, the transport plan may include other pieces of information.

"Plan identification information" is information for mutually identifying a plurality of transport plans.

"Vehicle identification information" is information for mutually identifying a plurality of vehicles utilized for transport. Each piece of plan identification information is associated with vehicle identification information of a vehicle allocated to each transport plan.

"Transport information" includes an order, a transport destination, a classification, a work time, a package weight, a work start time, and a work end time.

"Order" indicates a transport order.

"Transport destination" indicates a name and an address of a party to whom a package is to be delivered or a party from whom a package is to be collected.

"Classification" indicates a type of work, i.e. delivery or collection.

"Work time" indicates a time required for work (delivery/collection) to be performed at a transport destination.

"Package weight" indicates a weight of a package to be delivered to a delivery destination or a package to be collected at a collection destination.

"Work start time" indicates a time at which work (delivery/collection) starts at a transport destination.

"Work end time" indicates a time at which work (delivery/collection) ends at a transport destination.

"Base departure time" indicates a time at which a vehicle departs from a base such as an office. The vehicle departs from a base, then visits a plurality of transport destinations, and, thereafter, returns to the base. A base to depart from and a base to return to may be the same or different.

Such a transport plan is produced by utilizing any technique.

"Prediction Model"

Next, a prediction model is described. In the present example embodiment, a prediction model is produced by machine learning based on predetermined training data. A prediction model is used for prediction of SOC of a vehicle, and there are various variations in design thereof (what serves as an objective variable and what serves as an explanatory variable). One example of a prediction model is described below.

The prediction model is a model for predicting electricity consumption of a vehicle. Specifically, the prediction model is produced by machine learning based on training data with an explanatory variable being at least one parameter among load capacity of a vehicle, information relating to a route that a vehicle passes (pavement status of a road, predicted congestion status of a road, inclination status of a road, a curvature radius of a curve existing in a route, the number of right and left turns existing in a route, and the like), a weather condition for a current day (weather, temperature, humidity, wind speed, and the like), a vehicle type, air resistance according to a vehicle type, power consumption due to mounting, and the like, and with an objective variable being electricity consumption. The prediction model can be represented by a regression equation, for example, as illustrated in FIG. 8.

"Processing of Producing Remaining-Fuel-Amount Prediction Information"

Next, processing of producing remaining-fuel-amount prediction information, based on the transport plan and the prediction model described above is described. The processing is executed by a production apparatus. The production apparatus may be the processing apparatus 10, or may be an apparatus different from the processing apparatus 10.

—Processing of Acquiring SOC of a Vehicle at Base Departure—

First, the production apparatus acquires SOC of a vehicle at the base departure. For example, acquisition of SOC of a vehicle at base departure may be achieved in one of the following first to third examples.

First Example

For example, a user may input SOC of a vehicle at base departure to the production apparatus. Then, a production apparatus may acquire SOC of a vehicle at base departure input by the user. For example, the user visually recognizes information displayed by an in-vehicle apparatus or the like installed in the vehicle at any timing after business of a previous day is finished and until base departure on a current day, and thereby confirms SOC of the vehicle at the moment. Then, the user inputs confirmed SOC of the vehicle to the production apparatus as SOC of the vehicle at base departure.

Second Example

Otherwise, the production apparatus may communicate with an apparatus that manages SOC of a vehicle, and acquire SOC of the vehicle from the apparatus. For example, at any timing after business of a previous day is finished and until base departure on a current day, the production apparatus acquires SOC of the vehicle at the moment from the apparatus as SOC of the vehicle at base departure.

Third Example

Otherwise, the production apparatus may acquire reservation information indicating reservation status of a charging facility. The reservation information indicates a reservation time (reservation start time and reservation end time), and the vehicle identification information of the vehicle to be charged at the reservation time.

Then, after acquiring SOC (hereinafter referred to as "first SOC") of the vehicle at base departure by the method of the first example or the second example, the production apparatus computes, regarding a vehicle for which a reservation for a charging facility has been made at and after the acquisition and before departure from the base, SOC acquired by adding a charge amount to be charged by the reservation to the first SOC, as SOC of the vehicle at base departure. A charge amount to be charged by a reservation can be a smaller one of a product of a time from a reservation start time to a reservation end time and a charging velocity of a charging facility, and a free capacity of the vehicle (100%−capacity for (first SOC)).

—Processing of Producing Prediction Information, Based on SOC of a Vehicle at Base Departure and a Transport Plan—

The prediction information acquisition unit 11 divides a part from a base to depart from to a base to return to into a plurality of sections. Specifically, the production apparatus defines, as one section, each of "a part from the base to depart from to a first transport destination", "a part from the first transport destination to a second transport destination", "a part from the second transport destination to a third transport destination", . . . , "a part from a last transport destination to the base to return to".

Then, the production apparatus estimates electricity consumption of the vehicle for each section by use of the prediction model. For the prediction model, information relating to each section, specifically, at least one value among load capacity of the vehicle, information relating to a route that the vehicle passes (pavement status of a road, predicted congestion status of a road, inclination status of a road, a curvature radius of a curve existing in a route, the number of right and left turns existing in a route, and the like), a weather condition for a current day (weather, temperature, humidity, wind speed, and the like), a vehicle type, air resistance according to a vehicle type, power consumption due to mounting, and the like is input.

Then, the production apparatus assumes that electric power is consumed in each section with electricity consumption for each section, and computes a change in SOC of the vehicle during transport, i.e., a change in SOC of the vehicle from a base to depart from to a base to return to.

Herein, processing of determining load capacity of a vehicle in each section is described. As illustrated in FIG. 7, a transport plan indicates an order of transport, and a weight of a package to be delivered/collected at each transport destination. By use of the information, the load during transport can be determined.

First, by adding up package weights being relevant to the classification "delivery" in FIG. 7, a load capacity (hereinafter, referred to as "load capacity at departure") from the base to depart from to the first transport destination can be computed.

Then, in a case where a classification of the first transport destination is "delivery", a load capacity from the first transport destination to the second transport destination can be computed by subtracting, from the load capacity at departure, a weight of a package to be delivered at the first transport destination.

On the other hand, in a case where a classification of the first transport destination is "collection", a load capacity from the first transport destination to the second transport destination can be computed by adding a weight of a package to be collected at the first transport destination to the load capacity at departure.

Subsequently, a load capacity from a certain transport destination to a next transport destination, and a load capacity from a last transport destination to a base to return to can be similarly computed.

Other components of the processing apparatus 10 according to the present example embodiment are similar to those according to the first example embodiment. The processing apparatus 10 according to the present example embodiment achieves an advantageous effect similar to that according to the first example embodiment.

Third Example Embodiment

A processing apparatus 10 according to the present example embodiment has a function of more accurately determining whether correction of a prediction model is necessary. Specifically, the processing apparatus 10 determines whether correction of a prediction model is necessary, based on a degree of deviation between a plan value of a parameter input to the prediction model and an actual result value of the parameter. A detailed description is given below.

A prediction information acquisition unit 11 acquires a parameter plan value being a value of each of various parameters used for production of remaining-fuel-amount prediction information and being a value planned based on a transport plan.

As described in the second example embodiment, the various parameters include at least one of load capacity of a vehicle, information relating to a route that a vehicle passes (pavement status of a road, predicted congestion status of a road, inclination status of a road, a curvature radius of a curve existing in a route, the number of right and left turns existing in a route, and the like), a weather condition for a current day (weather, temperature, humidity, wind speed, and the like), a vehicle type, air resistance according to a vehicle type, power consumption due to mounting, and the like.

An acquisition method of a parameter plan value of load capacity of a vehicle is as described in the second example embodiment. Moreover, a parameter plan value of information relating to the route that a vehicle passes can be acquired by determining a route that goes around a plurality of transport destinations in an order shown in a transport plan by use of a well-known route search technique, and acquiring information relating to the route from map data. Moreover, a parameter plan value relating to a weather condition for a current day can be acquired by acquiring prediction of weather information for the current day from a server that provides weather information. Moreover, a vehicle type, air resistance according to the vehicle type, and a parameter plan value of power consumption due to mounting can be acquired by determining a vehicle allocated to each one indicated in a transport plan, and acquiring various pieces of information relating to the vehicle previously registered from a database.

An actual measurement information acquisition unit 12 acquires a parameter actual result values being actual result values of various parameters while traveling based on the transport plan is performed. For example, the actual measurement information acquisition unit 12 may acquire an actual result value of load capacity of a vehicle collected by various sensors installed in the vehicle, and information relating to a passage that the vehicle has actually passed. Otherwise, the actual measurement information acquisition unit 12 may acquire an actual result of weather information for a current day from a server that provides weather information. Otherwise, the actual measurement information acquisition unit 12 may acquire information for determining a vehicle actually used for execution of each transport plan by user input or the like, and then acquire, from the database, various previously registered information relating to the vehicle.

A determination unit 13 determines whether correction of the prediction model is necessary, further based on a comparison result between a parameter plan value and a parameter actual result value.

Herein, a purpose of the determination is described. A value of the above-described parameter input to the prediction model at production of remaining-fuel-amount prediction information is a parameter plan value planned based on a transport plan. In a case where traveling is actually performed based on a transport plan, there is a possibility that an order of transport, a route, an actually used vehicle, and the like are different from contents determined based on the transport plan for some reason. As a result, there is a possibility that actual result values of load capacity of a vehicle, information relating to a route, a vehicle type, air resistance according to a vehicle type, power consumption due to mounting, and the like may be different from parameter plan values planned based on the transport plan. Then, due to the deviation between the parameter plan value and the parameter actual result value, remaining-fuel-amount prediction information and remaining-fuel-amount actual measurement information may deviate from each other. In a cases where a cause of the deviation between the remaining-fuel-amount prediction information and the remaining-fuel-amount actual measurement information is the deviation between the parameter plan value and the parameter actual result value, correction of the prediction model is unnecessary. The determination unit 13 is configured in such a way as to perform determination for the purpose.

Specifically, the determination unit 13 may determine that correction of the prediction model is necessary in a case where the remaining-fuel-amount prediction information and the remaining-fuel-amount actual measurement information deviate from each other by equal to or more than a first criterion level, and the parameter plan value and the parameter actual result value do not deviate from each other more than a second criterion level. In this case, it is determined that a cause of the deviation between the remaining-fuel-amount prediction information and the remaining-fuel-amount actual measurement information is not the deviation between the parameter plan value and the parameter actual result value. Thus, it is determined that correction of the prediction model is necessary.

On the other hand, the determination unit 13 may determine that correction of the prediction model is unnecessary in a case where the remaining-fuel-amount prediction information and the remaining-fuel-amount actual measurement information deviate from each other by equal to or more than a first criterion level, and the parameter plan value and the parameter actual result value deviate from each other more than the second criterion level. In this case, it is determined that the cause of the deviation between the remaining-fuel-amount prediction information and the remaining-fuel-amount actual measurement information is the deviation between the parameter plan value and the parameter actual result value. Thus, it is determined that correction of the prediction model is unnecessary.

As a modified example, the determination unit 13 may perform the following determination processing in a case where the remaining-fuel-amount prediction information and the remaining-fuel-amount actual measurement information deviate from each other by equal to or more than the first criterion level, and the parameter plan value and the parameter actual result value deviate from each other more than a second criterion level.

First, the determination unit 13 produces remaining-fuel-amount prediction information by inputting a parameter actual result value to a prediction model. Then, in a case where the remaining-fuel-amount prediction information produced by inputting the parameter actual result value to the prediction model and actual fuel amount measurement information deviate from each other by equal to or more than a first criterion level, the determination unit 13 may determine that correction of the prediction model is necessary. Moreover, in a case where the remaining-fuel-amount prediction information produced by inputting the parameter actual result value to the prediction model and the remaining-fuel-amount actual measurement information do not deviate from each other more than the first criterion level, the determination unit 13 may determine that correction of the prediction model is unnecessary.

There are various conditions for determining "deviate by equal to or more than the second criterion level," but, for example, it may be "a deviation that satisfies a previously determined criterion exists in equal to or more than M parameters among a plurality of parameters". M is an integer equal to or more than 1.

The above "previously determined criterion" is determined for each parameter. For example, a criterion for load capacity, air resistance according to a vehicle type, and power consumption due to mounting may be "during traveling based on a transport plan, there is a place where a difference between a parameter plan value and a parameter actual result value is equal to or more than a threshold value", "during traveling based on the transport plan, an accumulated time in which a difference between a parameter plan value and a parameter actual result value is equal to or more than a threshold value is equal to or more than a threshold value", or the like.

Moreover, a criterion for a case of information relating to a route that a vehicle passes (pavement status of a road, predicted congestion status of a road, inclination status of a road, a curvature radius of a curve existing in a route, the number of right and left turns existing in a route, and the like) may be "a length of a route that does not match between a route determined in order to compute the parameter plan values and a route that a vehicle has actually traveled is equal to or more than a threshold value", or the like.

Moreover, in a case of a weather condition for a current day (weather, temperature, humidity, wind speed, and the like) and a vehicle type, the pieces of information may be quantified according to a previously determined rule. Then, a criterion for these cases may be "during traveling based on a transport plan, there is a place where a difference between a parameter plan value and a parameter actual result value is equal to or more than a threshold value", "during traveling based on a transport plan, an accumulated time in which a difference between a parameter plan value and a parameter actual result value is equal to or more than a threshold value is equal to or more than a threshold value, or the like.

Figure 9:
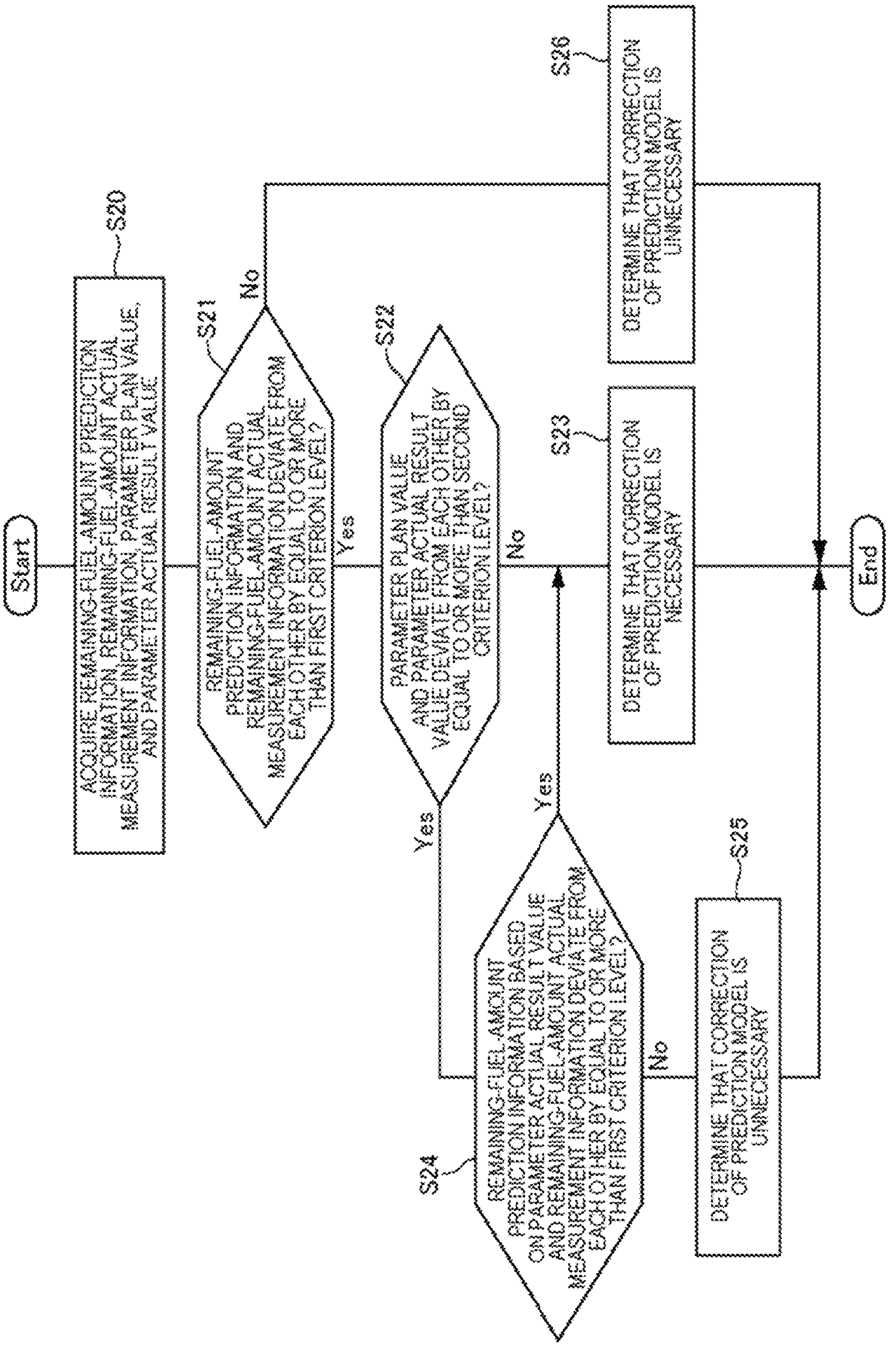
FIG. 9 is a flowchart illustrating one example of a flow of processing of the processing apparatus.

Next, one example of a flow of processing of the processing apparatus 10 is described by use of a flowchart in FIG. 9.

First, the processing apparatus 10 acquires remaining-fuel-amount prediction information, remaining-fuel-amount actual measurement information, a parameter plan value, and a parameter actual result value (S20). The remaining-fuel-amount prediction information is information produced based on the parameter plan value and a prediction model, and indicates a change in a predicted value of SOC of a vehicle while traveling based on a transport plan is performed. The remaining-fuel-amount prediction information indicates a change in an actual measurement value of SOC of the vehicle while traveling based on the transport plan is performed. The parameter plan value is a value of each of various parameters input to a prediction model, and a value planned based on a transport plan. The parameter actual result value is an actual result value of each of the various parameters described above while traveling is performed based on a transport plan.

Next, the processing apparatus 10 determines whether the remaining-fuel-amount prediction information and the remaining-fuel-amount actual measurement information deviate from each other by equal to or more than a first criterion level (S21). In a case where the remaining-fuel-amount prediction information and the remaining-fuel-amount actual measurement information deviate from each other by equal to or more than the first criterion level (Yes in S21), the processing apparatus 10 determines whether the parameter plan value and the parameter actual result value deviate from each other by equal to or more than a second criterion level (S22).

In a case where the parameter plan value and the parameter actual result value do not deviate from each other by equal to or more than the second criterion level (No in S22), the processing apparatus 10 determines that correction of the prediction model is necessary (S23). On the other hand, in a case where the parameter plan value and the parameter actual result value deviate from each other by equal to or more than the second criterion level (Yes in S22), the processing apparatus 10 produces remaining-fuel-amount prediction information by inputting the parameter actual result value to the prediction model, and determines whether the remaining-fuel-amount prediction information and the remaining-fuel-amount actual measurement information deviate from each other by equal to or more than the first criterion level (S24).

In a case where the remaining-fuel-amount prediction information produced by inputting the parameter actual result value to the prediction model and the remaining-fuel-amount actual measurement information deviate from each other by equal to or more than the first criterion level (Yes in S24), the processing apparatus 10 determines that correction of the prediction model is necessary (S23). On the other hand, in a case where the remaining-fuel-amount prediction information produced by inputting the parameter actual result value to the prediction model and the remaining-fuel-amount actual measurement information do not deviate from each other by equal to or more than the first criterion level (No in S24), the processing apparatus 10 determines that correction of the prediction model is unnecessary (S25).

Moreover, in a case where the remaining-fuel-amount prediction information acquired in S20 and the remaining-fuel-amount actual measurement information do not deviate from each other by equal to or more than the first criterion level (No in S21), the processing apparatus 10 determines that correction of the prediction model is unnecessary (S26).

The processing apparatus 10 may output determination results in S23, S25 and S26 via any output apparatus. An output apparatus is exemplified by a display, a projection apparatus, a speaker, a warning lamp, a printer, a mailer, or the like, but is not limited thereto.

Other components of the processing apparatus 10 according to the present example embodiment are similar to those according to the first and second example embodiments.

The processing apparatus 10 according to the present example embodiment achieves an advantageous effect similar to that according to the first and second example embodiments. Moreover, the processing apparatus 10 according to the present example embodiment can determine whether correction of a prediction model is necessary, based on a degree of deviation between a plan value of a parameter input to a prediction model and an actual result value of the parameter. As a result, it becomes possible to more accurately determine whether correction of the prediction model is necessary.

Fourth Example Embodiment

A processing apparatus 10 according to the present example embodiment has a function of more accurately determining whether correction of a prediction model is necessary. Specifically, the processing apparatus 10 determines whether correction of a prediction model is necessary, based on a degree of deviation between a sensor value relating to operation of a vehicle of a driver and a reference value. A detailed description is given below.

An actual measurement information acquisition unit 12 further acquires a sensor value being a value indicating a state of a vehicle while traveling based on a transport plan is performed and measured by a sensor installed in the vehicle.

The sensor value is a value relating to operation of a vehicle of a driver. For example, the sensor value indicates a state (operation content of the driver) of any operation target installed in the vehicle, such as a steering wheel, an accelerator, a brake, a winker, a wiper, various lamps, an air conditioner, and audio equipment. Moreover, the sensor value may indicate a state of the vehicle made according to operation of a driver, such as velocity and acceleration. Such a sensor value is acquirable by use of a well-known technique.

The determination unit 13 determines whether correction of a prediction model is necessary, based on a comparison result between a sensor value and a reference value. The reference value is a previously set value, and indicates a value during normal operation.

Herein, a purpose of the determination is described. Electricity consumption of a vehicle is changeable according to operation content of a driver. Thus, in a case where the operation content of the driver deviates from the normal operation assumed while remaining-fuel-amount prediction information is produced, this may cause the remaining-fuel-amount prediction information and the remaining-fuel-amount actual measurement information to deviate from each other. In a case where a cause of the deviation between the remaining-fuel-amount prediction information and the remaining-fuel-amount actual measurement information is the operation content of the driver, correction of the prediction model is unnecessary. The determination unit 13 is configured in such a way as to perform determination for the purpose.

Specifically, the determination unit 13 determines that correction of the prediction model is necessary in a case where the remaining-fuel-amount prediction information and the remaining-fuel-amount actual measurement information deviate from each other by equal to or more than a first criterion level, and the sensor value and the reference value do not deviate from each other more than a third criterion level. In this case, it is determined that a cause of the deviation between the remaining-fuel-amount prediction information and the remaining-fuel-amount actual measurement information is not the operation of the driver. Thus, it is determined that correction of the prediction model is necessary.

On the other hand, the determination unit 13 may determine that correction of the prediction model is necessary in a case where the remaining-fuel-amount prediction information and the remaining-fuel-amount actual measurement information deviate from each other by equal to or more than a first criterion level, and the sensor value and the reference value deviate from each other more than the third criterion level. In this case, it is determined that a cause of the deviation between the remaining-fuel-amount prediction information and the remaining-fuel-amount actual measurement information is the operation of the driver. Thus, it is determined that correction of the prediction model is unnecessary.

There are various conditions for determining "deviate by equal to or more than the third criterion level", but, for example, it may be "a deviation that satisfies a previously determined criterion exists in equal to or more than N sensor values among a plurality of sensor values". N is an integer equal to or more than 1.

The "previously determined criterion" described above is determined for each sensor value. For example, "during traveling based on a transport plan, there is a place where a difference between a sensor value and a reference value is equal to or more than a threshold value", "during traveling based on a transport plan, an accumulated time in which a difference between a sensor value and a reference value is equal to or more than a threshold value is equal to or more than a threshold value", or other values.

Note that, the determination unit 13 may output guidance prompting improvement in operation of a driver in a case where the sensor value and the reference value deviate from each other by equal to or more than a third criterion level. The output is achieved via any output apparatus such as a display, a projection apparatus, a speaker, a printer, or a mailer.

Figure 10:
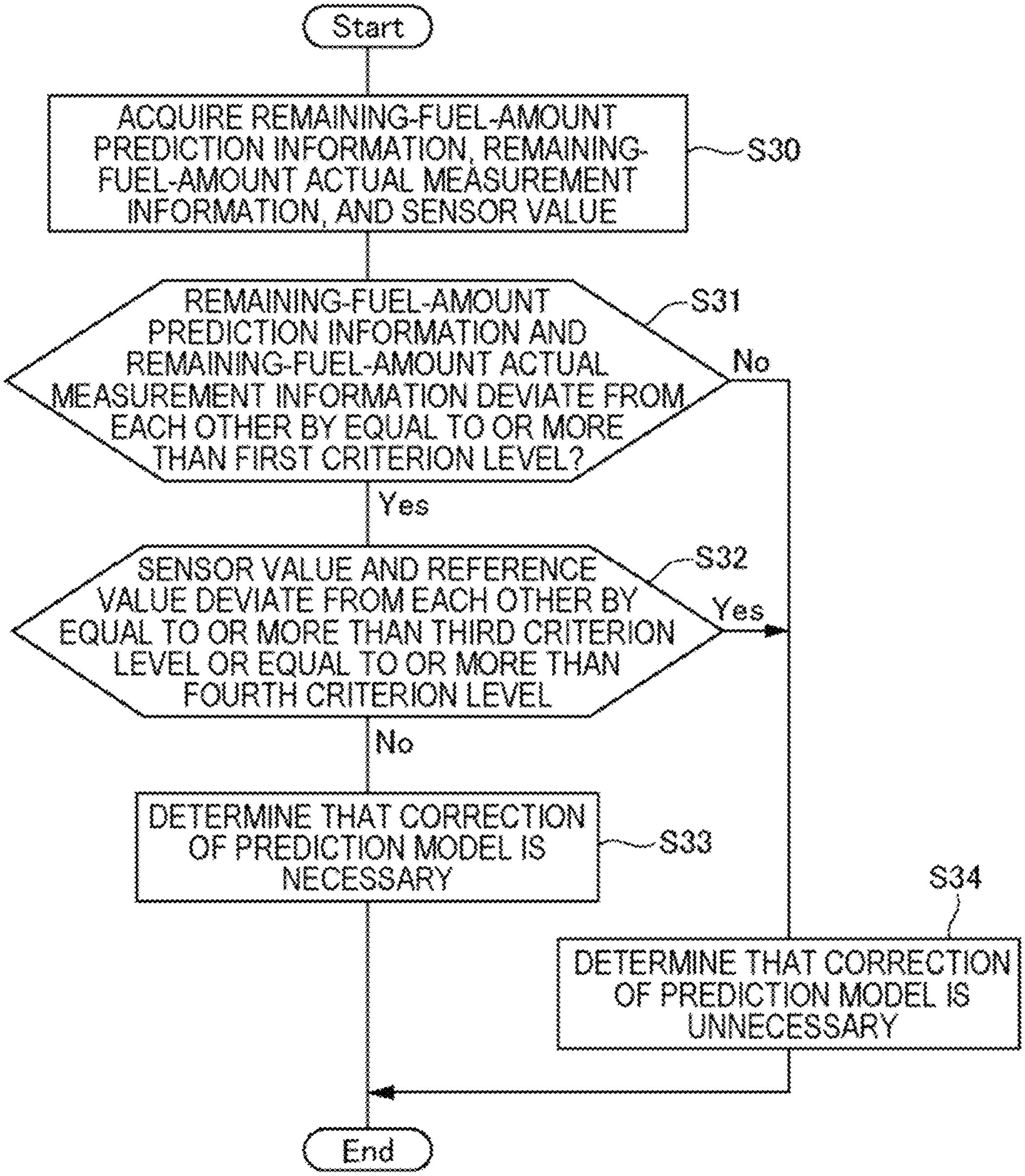
FIG. 10 is a flowchart illustrating one example of a flow of processing of the processing apparatus.

Next, one example of a flow of processing of the processing apparatus 10 is described by use of a flowchart in FIG. 10.

First, the processing apparatus 10 acquires remaining-fuel-amount prediction information, remaining-fuel-amount actual measurement information, and a sensor value (S30). The remaining-fuel-amount prediction information is information produced based on a prediction model, and indicates a change in a predicted value of SOC of a vehicle while traveling based on a transport plan is performed. The remaining-fuel-amount prediction information indicates a change in an actual measurement value of SOC of the vehicle while traveling based on the transport plan is performed. The sensor value is a value measured by a sensor installed in the vehicle while traveling based on the transport plan is performed, and is a value relating to operation of a driver.

Next, the processing apparatus 10 determines whether the remaining-fuel-amount prediction information and the remaining-fuel-amount actual measurement information deviate from each other by equal to or more than a first criterion level (S31). In a case where the remaining-fuel-amount prediction information and the actual remaining-fuel-amount actual measurement information deviate from each other by equal to or more than the first criterion level (Yes in S31), the processing apparatus 10 determines whether the sensor value and the reference value deviate from each other by equal to or more than a third criterion level (S32).

In a case where the sensor value and the reference value do not deviate from each other by equal to or more than the third criterion level (No in S32), the processing apparatus 10 determines that correction of the prediction model is necessary (S33). On the other hand, in a case where the sensor value and the reference value deviate from each other by equal to or more than the third criterion level (Yes in S32), the processing apparatus 10 determines that correction of the prediction model is unnecessary (S34).

Moreover, in a case where the remaining-fuel-amount prediction information acquired in S30 and the remaining-fuel-amount actual measurement information do not deviate from each other by equal to or more than the first criterion level (No in S31), the processing apparatus 10 determines that correction of the prediction model is unnecessary (S34).

The processing apparatus 10 may output determination results in S33 and S34 via any output apparatus. Moreover, in a case where it is Yes in S32, the processing apparatus 10 may output guidance prompting improvement in operation of a driver via any output apparatus. An output apparatus is exemplified by a display, a projection apparatus, a speaker, a warning lamp, a printer, a mailer, or the like, but is not limited thereto.

Other components of the processing apparatus 10 according to the present example embodiment are similar to those according to the first to third example embodiments.

The processing apparatus 10 according to the present example embodiment achieves an advantageous effect similar to that according to the first and third example embodiments. Moreover, the processing apparatus 10 according to the present example embodiment can determine whether correction of a prediction model is necessary, based on operation content of a driver. As a result, it becomes possible to more accurately determine whether correction of the prediction model is necessary.

Fifth Example Embodiment

A processing apparatus 10 according to the present example embodiment has a function of more accurately determining whether correction of a prediction model is necessary. Specifically, the processing apparatus 10 determines whether correction of a prediction model is necessary, based on a degree of deviation between a sensor value relating to performance of a vehicle and the reference value. A detailed description is given below.

An actual measurement information acquisition unit 12 further acquires a sensor value being a value indicating a state of a vehicle while traveling based on a transport plan is performed and measured by a sensor installed in the vehicle.

A sensor value is a value relating to performance of a vehicle. For example, a sensor value is exemplified by a value measured by a sensor (a pressure sensor, an exhaust gas sensor, a crank angle sensor, and the like) utilized for engine control, a value indicating a state of an operation target such as a steering wheel, an accelerator, and a brake, a value indicating a state of a vehicle such as velocity and acceleration, or the like, but is not limited thereto. Such a sensor value is acquirable by use of a well-known technique.

A determination unit 13 determines whether correction of a prediction model is necessary, based on a comparison result between a sensor value and a reference value. The reference value is a previously set value, and indicates performance of a vehicle during a normal condition.

Herein, a purpose of the determination is described. Electricity consumption of a vehicle is changeable according to operation content of a driver. In a case where performance has deteriorated due to a failure, aged deterioration, or the like, electricity consumption becomes worse. Thus, in a case where performance of a vehicle deviates from normal performance assumed while remaining-fuel-amount prediction information is produced, this may cause the remaining-fuel-amount prediction information and remaining-fuel-amount actual measurement information to deviate from each other. In a case where a cause of the deviation between the remaining-fuel-amount prediction information and the remaining-fuel-amount actual measurement information is performance of the vehicle, correction of the prediction model is unnecessary. The determination unit 13 is configured in such a way as to perform determination for the purpose.

Specifically, the determination unit 13 determines that correction of a prediction model is necessary in a case where the remaining-fuel-amount prediction information and the remaining-fuel-amount actual measurement information deviate from each other by equal to or more than a first criterion level, and the sensor value and the reference value do not deviate from each other more than a fourth criterion level. In this case, it is determined that a cause of the deviation between the remaining-fuel-amount prediction information and the remaining-fuel-amount actual measurement information is not the performance of the vehicle. Thus, it is determined that correction of the prediction model is necessary.

On the other hand, the determination unit 13 may determine that correction of a prediction model is necessary in a case where the remaining-fuel-amount prediction information and the remaining-fuel-amount actual measurement information deviate from each other by equal to or more than the first criterion level, and the sensor value and the reference value deviate from each other more than the fourth criterion level. In this case, it is determined that a cause of deviation between the remaining-fuel-amount prediction information and the remaining-fuel-amount actual measurement information is performance of the vehicle. Thus, it is determined that correction of the prediction model is unnecessary.

There are various conditions for determining "deviate by equal to or more than the fourth criterion level", but, for example, it may be "a deviation that satisfies a previously determined criterion exists in equal to or more than P values among a plurality of sensor values". P is an integer equal to or more 1.

The "previously determined criterion" described above is determined for each sensor value. For example, "during traveling based on a transport plan, there is a place where a difference between a sensor value and a reference value is equal to or more than a threshold value", "during traveling based on a transport plan, an accumulated time in which a difference between a sensor value and a reference value is equal to or more than a threshold value is equal to or more than a threshold value", or other values.

Note that, the determination unit 13 may output information notifying of a trouble in performance of a vehicle in a case where the sensor value and the reference value deviate from each other by equal to or more than the fourth criterion level. The output is achieved via any output apparatus such as a display, a projection apparatus, a speaker, a printer, or a mailer.

Next, one example of a flow of processing of the processing apparatus 10 is described by use of a flowchart in FIG. 10.

First, the processing apparatus 10 acquires remaining-fuel-amount prediction information, remaining-fuel-amount actual measurement information, and a sensor value (S30). The remaining-fuel-amount prediction information is information produced based on a prediction model, and indicates a change in a predicted value of SOC of a vehicle while traveling based on a transport plan is performed. The remaining-fuel-amount prediction information indicates a change in an actual measurement value of SOC of a vehicle while traveling based on a transport plan is performed. The sensor value is a value measured by a sensor installed in a vehicle while traveling based on the transport plan is performed, and is a value relating to performance of the vehicle.

Next, the processing apparatus 10 determines whether the remaining-fuel-amount prediction information and the remaining-fuel-amount actual measurement information deviate from each other by equal to or more than a first criterion level (S31). In a case where the remaining-fuel-amount prediction information and the remaining-fuel-amount actual measurement information deviate from each other by equal to or more than the first criterion level (Yes in S31), the processing apparatus 10 determines whether the sensor value and the reference value deviate from each other by equal to or more than the fourth criterion level (S32).

In a case where the sensor value and the reference value do not deviate from each other by equal to or more than the fourth criterion level (No in S32), the processing apparatus 10 determines that correction of the prediction model is necessary (S23). On the other hand, in a case where the sensor value and the reference value deviate from each other by equal to or more than the fourth criterion level (Yes in S32), the processing apparatus 10 determines that correction of the prediction model is unnecessary (S34).

In addition, in a case where the remaining-fuel-amount prediction information acquired in S30 and the remaining-fuel-amount actual measurement information do not deviate from each other by equal to or more than the first criterion level (No in S31), the processing apparatus 10 determines that correction of the prediction model is unnecessary (S34).

The processing apparatus 10 may output the determination results in S33 and S34 via any output apparatus. Moreover, in a case where it is Yes in S32, the processing apparatus 10 may output, via any output apparatus, information notifying of a trouble in performance of a vehicle. An output apparatus is exemplified by a display, a projection apparatus, a speaker, a warning lamp, a printer, a mailer, or the like, but is not limited thereto.

Other components of the processing apparatus 10 according to the present example embodiment are similar to those according to the first to fourth example embodiments.

The processing apparatus 10 according to the present example embodiment achieves an advantageous effect similar to that according to the first and fourth example embodiments. Moreover, the processing apparatus 10 according to the present example embodiment can determine whether correction of a prediction model is necessary, based on performance of a vehicle. As a result, it becomes possible to more accurately determine whether correction of the prediction model is necessary.

Sixth Example Embodiment

The processing apparatus 10 according to the present example embodiment determines whether correction of a prediction model is necessary, by combining at least two of "determination based on a comparison result between a parameter plan value and a parameter actual result value" described in the third example embodiment, "determination based on a comparison result between a sensor value relating to operation of a driver and a reference value" described in the fourth example embodiment, and "determination based on a comparison result between a sensor value relating to performance of a vehicle and a reference value" described in the fifth example embodiment. A detailed description is given below.

First Example

The first example determines whether correction of a prediction model is necessary, by combining "determination based on a comparison result between a parameter plan value and a parameter actual result value" described in the third example embodiment, "determination based on a comparison result between a sensor value relating to operation of a driver and a reference value" described in the fourth example embodiment, and "determination based on a comparison result between a sensor value relating to performance of a vehicle and a reference value" described in the fifth example embodiment.

A determination unit 13 determines that correction of a prediction model is necessary in a case where remaining-fuel-amount prediction information and remaining-fuel-amount actual measurement information deviate from each other by equal to or more than a first criterion level, a parameter plan value and a parameter actual result value do not deviate from each other more than a second criterion level, a sensor value relating to operation of a driver and a reference value do not deviate from each other more than a third criterion level, and a sensor value relating to performance of a vehicle and a reference value do not deviate from each other more than a fourth criterion level.

Then, although remaining-fuel-amount prediction information and remaining-fuel-amount actual measurement information deviate from each other by equal to or more than a first criterion level, the determination unit 13 determines that correction of the prediction model is unnecessary in a case where a parameter plan value and a parameter actual result value deviate from each other more than a second criterion level, a sensor value relating to operation of a driver and a reference value deviate from each other more than a third criterion level, or a sensor value relating to performance of a vehicle and a reference value deviate from each other more than a fourth criterion level.

Moreover, the determination unit 13 determines that correction of the prediction model is unnecessary in a case where the remaining-fuel-amount prediction information and the remaining-fuel-amount actual measurement information do not deviate from each other by equal to or more than the first criterion level.

Note that, in a case where remaining-fuel-amount prediction information and remaining-fuel-amount actual measurement information deviate from each other by equal to or more than a first criterion level, the following determination processing may be performed in a case where a sensor value relating to operation of a driver and a reference value do not deviate from each other more than a third criterion level, a sensor value relating to performance of a vehicle and a reference value do not deviate from each other more than a fourth criterion level, and a parameter plan value and a parameter actual result value deviate from each other more than a second criterion level.

First, the determination unit 13 produces remaining-fuel-amount prediction information by inputting a parameter actual result value to a prediction model. Then, in a case where the remaining-fuel-amount prediction information produced by inputting the parameter actual result value to the prediction model and actual fuel amount measurement information deviate from each other by equal to or more than a first criterion level, the determination unit 13 may determine that correction of the prediction model is necessary. Moreover, in a case where the remaining-fuel-amount prediction information produced by inputting the parameter actual result value to the prediction model and the remaining-fuel-amount actual measurement information do not deviate from each other more than the first criterion level, the determination unit 13 may determine that correction of the prediction model is unnecessary.

Second Example

The second example determines whether correction of a prediction model is necessary, by combining "determination based on a comparison result between a parameter plan value and a parameter actual result value" described in the third example embodiment, and "determination based on a comparison result between a sensor value relating to operation of a driver and a reference value" described in the fourth example embodiment.

The determination unit 13 determines that correction of the prediction model is necessary in a case where remaining-fuel-amount prediction information and remaining-fuel-amount actual measurement information deviate from each other by equal to or more than a first criterion level, a parameter plan value and a parameter actual result value do not deviate from each other more than a second criterion level, and a sensor value relating to operation of a driver and a reference value do not deviate from each other more than a third criterion level.

Then, although remaining-fuel-amount prediction information and actual remaining-fuel-amount actual measurement information deviate from each other by equal to or more than a first criterion level, the determination unit 13 determines that correction of the prediction model is unnecessary in a case where a parameter plan value and a parameter actual result value deviate from each other more than a second criterion level, or a sensor value relating to operation of a driver and a reference value deviate from each other by equal to or more than a third criterion level.

Moreover, the determination unit 13 determines that correction of the prediction model is unnecessary in a case where the remaining-fuel-amount prediction information and the remaining-fuel-amount actual measurement information do not deviate from each other by equal to or more than the first criterion level.

Note that, in a case where remaining-fuel-amount prediction information and remaining-fuel-amount actual measurement information deviate from each other by equal to or more than a first criterion level, the following determination processing may be performed in a case where a sensor value relating to operation of a driver and a reference value do not deviate from each other more than a third criterion level, and a parameter plan value and a parameter actual result value deviate from each other more than a second criterion level.

First, the determination unit 13 produces remaining-fuel-amount prediction information by inputting a parameter actual result value to a prediction model. Then, in a case where the remaining-fuel-amount prediction information produced by inputting the parameter actual result value to the prediction model and actual fuel amount measurement information deviate from each other by equal to or more than a first criterion level, the determination unit 13 may determine that correction of the prediction model is necessary. Moreover, in a case where the remaining-fuel-amount prediction information produced by inputting the parameter actual result value to the prediction model and the remaining-fuel-amount actual measurement information do not deviate from each other more than the first criterion level, the determination unit 13 may determine that correction of the prediction model is unnecessary.

Third Example

The third example determines whether correction of a prediction model is necessary, by combining "determination based on a comparison result between a parameter plan value and a parameter actual result value" described in the third example embodiment, and "determination based on a comparison result between a sensor value relating to performance of a vehicle and a reference value" described in the fifth example embodiment.

The determination unit 13 determines that correction of the prediction model is necessary in a case where remaining-fuel-amount prediction information and remaining-fuel-amount actual measurement information deviate from each other by equal to or more than a first criterion level, a parameter plan value and a parameter actual result value do not deviate from each other more than a second criterion level, and a sensor value relating to performance of a vehicle and a reference value do not deviate from each other more than a fourth criterion level.

Then, although remaining-fuel-amount prediction information and remaining-fuel-amount actual measurement information deviate from each other by equal to or more than a first criterion level, the determination unit 13 determines that correction of the prediction model is unnecessary in a case where a parameter plan value and a parameter actual result value deviate from each other more than a second criterion level, or a sensor value relating to performance of a vehicle and a reference value deviate from each other more than a fourth criterion level.

Moreover, the determination unit 13 determines that correction of the prediction model is unnecessary in a case where the remaining-fuel-amount prediction information and the remaining-fuel-amount actual measurement information do not deviate from each other by equal to or more than the first criterion level.

Note that, in a case where remaining-fuel-amount prediction information and remaining-fuel-amount actual measurement information deviate from each other by equal to or more than a first criterion level, the following determination processing may be performed in a case where a sensor value relating to performance of a vehicle and a reference value do not deviate from each other more than a fourth criterion level, and a parameter plan value and a parameter actual result value deviate from each other more than a second criterion level.

First, the determination unit 13 produces remaining-fuel-amount prediction information by inputting a parameter actual result value to a prediction model. Then, in a case where the remaining-fuel-amount prediction information produced by inputting the parameter actual result value to the prediction model and actual fuel amount measurement information deviate from each other by equal to or more than a first criterion level, the determination unit 13 may determine that correction of the prediction model is necessary. Moreover, in a case where the remaining-fuel-amount prediction information produced by inputting the parameter actual result value to the prediction model and the remaining-fuel-amount actual measurement information do not deviate from each other more than the first criterion level, the determination unit 13 may determine that correction of the prediction model is unnecessary.

Fourth Example

A fourth example determines whether correction of a prediction model is necessary, by combining "determination based on a comparison result between a sensor value relating to operation of a driver and a reference value" described in the fourth example embodiment, and "determination based on a comparison result between a sensor value relating to performance of a vehicle and a reference value" described in the fifth example embodiment.

The determination unit 13 determines that correction of the prediction model is necessary in a case where remaining-fuel-amount prediction information and remaining-fuel-amount actual measurement information deviate from each other by equal to or more than a first criterion level, a sensor value relating to operation of a driver and a reference value do not deviate from each other more than a third criterion level, and a sensor value relating to performance of a vehicle and a reference value do not deviate from each other more than a fourth criterion level.

Then, although remaining-fuel-amount prediction information and remaining-fuel-amount actual measurement information deviate from each other by equal to or more than a first criterion level, the determination unit 13 determines that correction of the prediction model is unnecessary in a case where a sensor value relating to operation of a driver and a reference value do not deviate from each other more than a third criterion level, and a sensor value relating to performance of a vehicle and a reference value deviate from each other more than a fourth criterion level.

Moreover, the determination unit 13 determines that correction of the prediction model is unnecessary in a case where the remaining-fuel-amount prediction information and the remaining-fuel-amount actual measurement information do not deviate from each other by equal to or more than the first criterion level.

Figure 11:
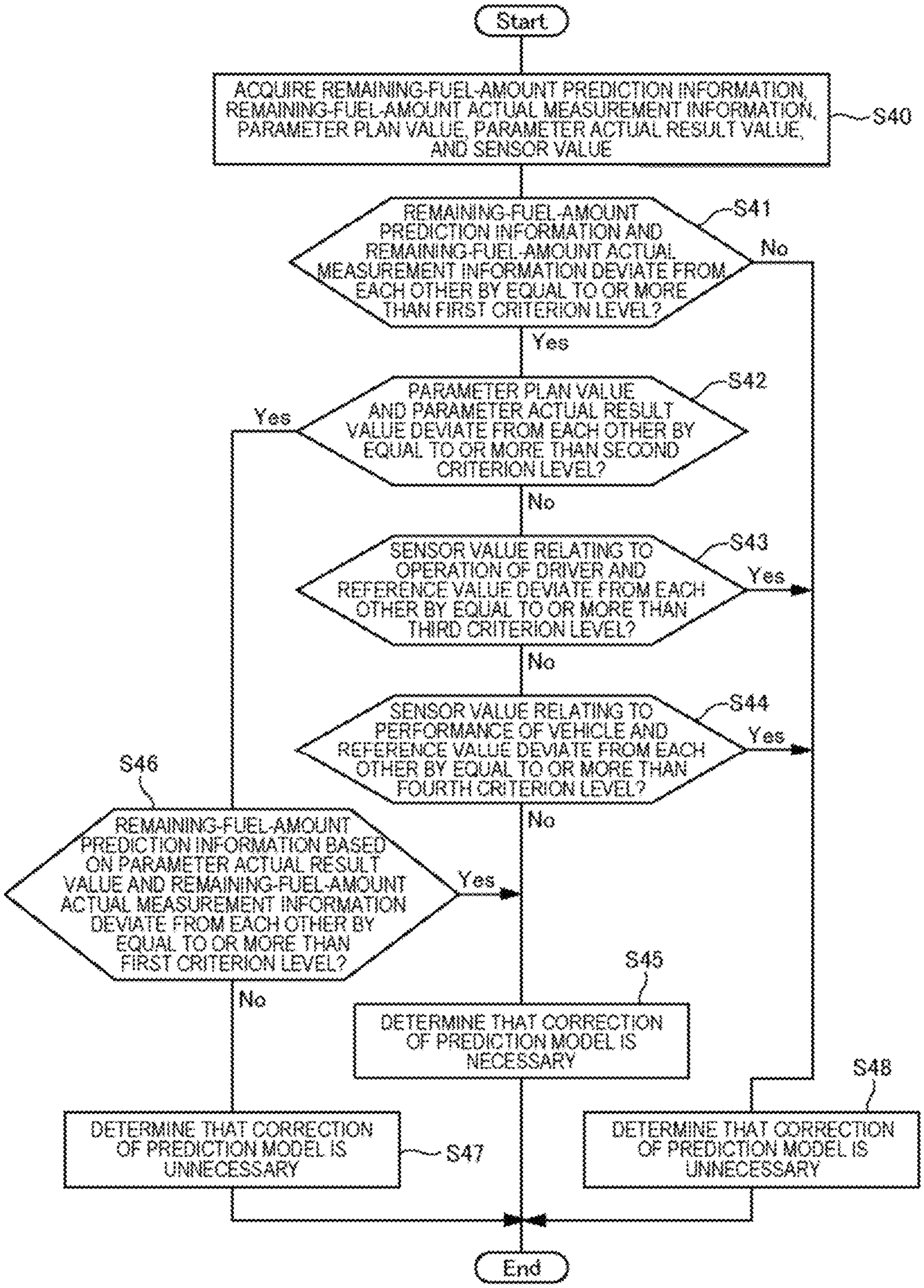
FIG. 11 is a flowchart illustrating one example of a flow of processing of the processing apparatus.

Next, one example of a flow of processing in the first example is described by use of a flowchart in FIG. 11.

First, the processing apparatus 10 acquires remaining-fuel-amount prediction information, remaining-fuel-amount actual measurement information, a parameter plan value, a parameter actual result value, and a sensor value (S40).

Next, the processing apparatus 10 determines whether the remaining-fuel-amount prediction information and the remaining-fuel-amount actual measurement information deviate from each other by equal to or more than a first criterion level (S41). In a case where the remaining-fuel-amount prediction information and the remaining-fuel-amount actual measurement information do not deviate from each other by equal to or more than the first criterion level (No in S41), the processing apparatus 10 determines that correction of the prediction model is unnecessary (S48). On the other hand, in a case where the remaining-fuel-amount prediction information and the remaining-fuel-amount actual measurement information deviate from each other by equal to or more than the first criterion level (Yes in S41), the processing apparatus 10 determines whether the parameter plan value and the parameter actual result value deviate from each other by equal to or more than a second criterion level (S42).

In a case where the parameter plan value and the parameter actual result value deviate from each other by equal to or more than the second criterion level (Yes in S42), the processing apparatus 10 performs processing in and after S46. On the other hand, in a case where the parameter plan value and the parameter actual result value do not deviate from each other by equal to or more than the second criterion level (No in S42), the processing apparatus 10 determines whether a sensor value relating to operation of a driver and the reference value deviate from each other by equal to or more than a third criterion level (S43).

In a case where the sensor value relating to operation of the driver and the reference value deviate from each other by equal to or more than the third criterion level (Yes in S43), the processing apparatus 10 determines that correction of the prediction model is unnecessary (S48). On the other hand, in a case where the sensor value relating to operation of the driver and the reference value do not deviate from each other by equal to or more than the third criterion level (No in S43), the processing apparatus 10 determines whether a sensor value relating to performance of a vehicle and a reference value deviate from each other more than the fourth criterion level (S44).

In a case where the sensor value relating to performance of a vehicle and the reference value deviate from each other by equal to or more than a fourth criterion level (Yes in S44), the processing apparatus 10 determines that correction of the prediction model is unnecessary (S48). On the other hand, in a case where the sensor value relating to performance of a vehicle and the reference value do not deviate from each other by equal to or more than the fourth criterion level (No in S44), the processing apparatus 10 determines that correction of the prediction model is necessary (S45).

In a case where it is Yes in S42, the processing apparatus 10 produces remaining-fuel-amount prediction information by inputting a parameter actual result value to the prediction model, and determines whether the remaining-fuel-amount prediction information and remaining-fuel-amount actual measurement information deviate from each other by equal to or more than a first criterion level (S46).

In a case where the remaining-fuel-amount prediction information produced by inputting the parameter actual result value to the prediction model and the remaining-fuel-amount actual measurement information deviate from each other by equal to or more than the first criterion level (Yes in S46), the processing apparatus 10 determines that correction of the prediction model is necessary (S45). On the other hand, in a case where the remaining-fuel-amount prediction information produced by inputting the parameter actual result value to the prediction model and the remaining-fuel-amount actual measurement information do not deviate from each other by equal to or more than the first criterion level (No in S46), the processing apparatus 10 determines that correction of the prediction model is unnecessary (S47).

The processing apparatus 10 may output determination results in S45, S47 and S48 via any output apparatus. Moreover, in a case where it is Yes in S43, the processing apparatus 10 may output guidance prompting improvement in operation of a driver via any output apparatus. Moreover, in a case where it is Yes in S44, the processing apparatus 10 may output, via any output apparatus, information notifying of a trouble in performance of a vehicle. An output apparatus is exemplified by a display, a projection apparatus, a speaker, a warning lamp, a printer, a mailer, or the like, but is not limited thereto.

Note that, a processing order of S42, S43, and S44 is not limited to that illustrated in FIG. 11, and can also be another order.

Other components of the processing apparatus 10 according to the present example embodiment are similar to those according to the first to fifth example embodiments.

The processing apparatus 10 according to the present example embodiment achieves an advantageous effect similar to that according to the first to fifth example embodiments. Moreover, the processing apparatus 10 according to the present example embodiment can determine whether correction of a prediction model is necessary, based on at least two of a degree of deviation between a plan value of a parameter input to a prediction model and an actual result value of the parameter, an operation content of a driver, and performance of a vehicle. As a result, it becomes possible to more accurately determine whether correction of a prediction model is necessary.

Herein, a modified example applicable to all example embodiments is described. In the example embodiments described above, a prediction model is produced by machine learning based on predetermined training data. As a modified example, a prediction model may be produced by rule-based logic, and various parameters may be adjusted in a manner similar to the example embodiments described above.

The example embodiments of the present invention have been described above with reference to the drawings, but are exemplifications of the present invention, and various configurations other than those described above can be adopted. The components according to the example embodiments described above may be combined with each other, or some components may be replaced with other components. Moreover, various modifications may be made to the configuration according to the example embodiment described above without departing from the scope of the present embodiment. Moreover, the configurations and pieces of processing disclosed in each of the example embodiments and modified examples described above may be combined with each other.

Note that, in the present specification, "acquisition" includes at least one of "fetching, by a local apparatus, data stored in another apparatus or a storage medium (active acquisition)", for example, receiving by requesting or inquiring of the another apparatus, accessing the another apparatus or the storage medium and reading, and the like, based on a user input, or based on an instruction of a program, "inputting, into a local apparatus, data output from another apparatus (passive acquisition)", for example, receiving data given by distribution (or transmission, push notification, or the like), selecting and acquiring from received data or information, based on a user input, or based on an instruction of a program, and "generating new data by editing of data (conversion into text, rearrangement of data, extraction of partial data, changing of a file format, or the like) or the like, and acquiring the new data".

Moreover, the invention has been described with a transport plan as an example in the present specification, but it is not limited thereto, and the present invention may be applied to a movement plan and the like. As one example of a movement plan, route information indicated by, for example, a car navigation system installed in a vehicle can be cited. By applying the present invention to the movement plan, a similar advantageous effect can be acquired not only during transport but also during movement of a vehicle.

Some or all of the above-described example embodiments can also be described as, but are not limited to, the following supplementary notes.

1. A processing apparatus including:
   - a prediction information acquisition unit that acquires remaining-fuel-amount prediction information indicating a change in a predicted value of a remaining amount of fuel in a vehicle while traveling based on a transport plan is performed and being produced based on a prediction model;
   - an actual measurement information acquisition unit that acquires remaining-fuel-amount actual measurement information indicating a change in an actual measurement value of a remaining amount of fuel in the vehicle while traveling based on the transport plan is performed; and
   - a determination unit that determines, based on the remaining-fuel-amount prediction information and the remaining-fuel-amount actual measurement information, whether correction of the prediction model is necessary.

2. The processing apparatus according to supplementary note 1, wherein a remaining amount of fuel in the vehicle is indicated by SOC.

3. The processing apparatus according to supplementary note 1 or 2, wherein the prediction information acquisition unit further acquires a parameter plan value being a value of each of various parameters used for production of the remaining-fuel-amount prediction information and being a value planned based on the transport plan, the actual measurement information acquisition unit further acquires a parameter actual result value being an actual result value of each of the various parameters while traveling based on the transport plan is performed, and the determination unit determines, further based on a comparison result between the parameter plan value and the parameter actual result value, whether correction of the prediction model is necessary.

4. The processing apparatus according to supplementary note 3, wherein the determination unit determines that correction of the prediction model is necessary in a case where the remaining-fuel-amount prediction information and the remaining-fuel-amount actual measurement information deviate from each other by equal to or more than a first criterion level, and the parameter plan value and the parameter actual result value do not deviate from each other more than a second criterion level.

5. The processing apparatus according to supplementary note 1 or 2, wherein the actual measurement information acquisition unit further acquires a sensor value being a value indicating a state of the vehicle while traveling based on the transport plan is performed and being measured by a sensor installed in the vehicle, and the determination unit determines, further based on a comparison result between the sensor value and a reference value, whether correction of the prediction model is necessary.

6. The processing apparatus according to supplementary note 5, wherein the sensor value is a value relating to operation of a driver, the reference value indicates a value during normal operation, and the determination unit determines that correction of the prediction model is necessary in a case where the remaining-fuel-amount prediction information and the remaining-fuel-amount actual measurement information deviate from each other by equal to or more than a first criterion level, and the sensor value and the reference value do not deviate from each other more than a third criterion level.

7. The processing apparatus according to supplementary note 6, wherein the determination unit outputs guidance prompting improvement in operation of a driver in a case where the sensor value and the reference value deviate from each other by equal to or more than the third criterion level.

8. The processing apparatus according to supplementary note 5, wherein the sensor value is a value relating to performance of the vehicle, the reference value indicates a value of normal performance of the vehicle, and the determination unit determines that correction of the prediction model is necessary in a case where the remaining-fuel-amount prediction information and the remaining-fuel-amount actual measurement information deviate from each other by equal to or more than a first criterion level, and the sensor value and the reference value do not deviate from each other more than a fourth criterion level.

9. The processing apparatus according to supplementary note 8, wherein the determination unit outputs information notifying of a trouble in performance of the vehicle in a case where the sensor value and the reference value deviate from each other by equal to or more than the fourth criterion level.

10. The processing apparatus according to supplementary note 1 or 2, wherein the prediction information acquisition unit further acquires a parameter plan value being a value of each of various parameters used for production of the remaining-fuel-amount prediction information and being a value planned based on the transport plan, the actual measurement information acquisition unit further acquires a parameter actual result value being an actual result value of each of the various parameters while traveling based on the transport plan is performed, the actual measurement information acquisition unit further acquires a sensor value being a value indicating a state of the vehicle while traveling based on the transport plan is performed, and being measured by a sensor installed in the vehicle, and the determination unit determines, further based on a comparison result between the parameter plan value and the parameter actual result value and a comparison result between the sensor value and the reference value, whether correction of the prediction model is necessary.

11. A processing method of executing, by a computer:

a prediction information acquisition step of acquiring remaining-fuel-amount prediction information indicating a change in a predicted value of a remaining amount of fuel in a vehicle while traveling based on a transport plan is performed and being produced based on a prediction model;

an actual measurement information acquisition step of acquiring remaining-fuel-amount actual measurement information indicating a change in an actual measurement value of a remaining amount of fuel in the vehicle while traveling based on the transport plan is performed; and a determination step of determining, based on the remaining-fuel-amount prediction information and the remaining-fuel-amount actual measurement information, whether correction of the prediction model is necessary.

12. A program causing a computer to function as:

a prediction information acquisition unit that acquires remaining-fuel-amount prediction information indicating a change in a predicted value of a remaining amount of fuel in a vehicle while traveling based on a transport plan is performed and being produced based on a prediction model;

an actual measurement information acquisition unit that acquires remaining-fuel-amount actual measurement information indicating a change in an actual measurement value of a remaining amount of fuel in the vehicle while traveling based on the transport plan is performed; and a determination unit that determines, based on the remaining-fuel-amount prediction information and the remaining-fuel-amount actual measurement information, whether correction of the prediction model is necessary.

REFERENCE SIGNS LIST

10 Processing apparatus
11 Prediction information acquisition unit
12 Actual measurement information acquisition unit
13 Determination unit
1A Processor
2A Memory
3A Input/output I/F
4A Peripheral circuit
5A Bus

What is claimed is:

1. A processing apparatus comprising:

at least one memory configured to store one or more instructions; and at least one processor configured to execute the one or more instructions to:

acquire remaining-fuel-amount prediction information indicating a change in a predicted value of a remaining amount of fuel in a vehicle while traveling based on a transport plan is performed and being produced based on a prediction model;

acquire remaining-fuel-amount actual measurement information indicating a change in an actual measurement value of a remaining amount of fuel in the vehicle while traveling based on the transport plan is performed;

acquire a sensor value being a value indicating a state of the vehicle while traveling based on the transport plan is performed and being measured by a sensor installed in the vehicle;

determine, based on the remaining-fuel-amount prediction information and the remaining-fuel-amount actual measurement information and based on a comparison result between the sensor value and a reference value, whether correction of the prediction model is necessary; and in response to a determination that a correction of the prediction model is necessary, correct the prediction model, wherein the prediction model is a machine learning model trained on at least one explanatory variable, the sensor value is a value relating to operation of a driver, the reference value indicates a value during normal operation, and the at least one processor is further configured to execute the one or more instructions to determine that correction of the prediction model is necessary in a case where the remaining-fuel-amount prediction information and the remaining-fuel-amount actual measurement information deviate from each other by equal to or more than a first criterion level, and the sensor value and the reference value do not deviate from each other more than a third criterion level.

2. The processing apparatus according to claim 1, wherein a remaining amount of fuel in the vehicle is indicated by state of charge (SOC).

3. The processing apparatus according to claim 1, wherein the at least one processor is further configured to execute the one or more instructions to acquire a parameter plan value being a value of each of various parameters used for production of the remaining-fuel-amount prediction information and being a value planned based on the transport plan, acquire a parameter actual result value being an actual result value of each of the various parameters while traveling based on the transport plan is performed, and determine, further based on a comparison result between the parameter plan value and the parameter actual result value, whether correction of the prediction model is necessary.

4. The processing apparatus according to claim 3, wherein the at least one processor is further configured to execute the one or more instructions to determine that correction of the prediction model is necessary in a case where the remaining-fuel-amount prediction information and the remaining-fuel-amount actual measurement information deviate from each other by equal to or more than a first criterion level, and the parameter plan value and the parameter actual result value do not deviate from each other more than a second criterion level.

5. The processing apparatus according to claim 1, wherein the at least one processor is further configured to execute the one or more instructions to output guidance prompting improvement in operation of a driver in a case where the sensor value and the reference value deviate from each other by equal to or more than the third criterion level.

6. The processing apparatus according to claim 1, wherein the sensor value is a value relating to performance of the vehicle, the reference value indicates a value of normal performance of the vehicle, and the at least one processor is further configured to execute the one or more instructions to determine that correction of the prediction model is necessary in a case where the remaining-fuel-amount prediction information and the remaining-fuel-amount actual measurement information deviate from each other by equal to or more than a first criterion level, and the sensor value and the reference value do not deviate from each other more than a fourth criterion level.

7. The processing apparatus according to claim 6, wherein the at least one processor is further configured to execute the one or more instructions to output information notifying of a trouble in performance of the vehicle in a case where the sensor value and the reference value deviate from each other by equal to or more than the fourth criterion level.

8. The processing apparatus according to claim 1, wherein the at least one processor is further configured to execute the one or more instructions to acquire a parameter plan value being a value of each of various parameters used for production of the remaining-fuel-amount prediction information and being a value planned based on the transport plan, acquire a parameter actual result value being an actual result value of each of the various parameters while traveling based on the transport plan is performed, acquire a sensor value being a value indicating a state of the vehicle while traveling based on the transport plan is performed, and being measured by a sensor installed in the vehicle, and determine, further based on a comparison result between the parameter plan value and the parameter actual result value and a comparison result between the sensor value and the reference value, whether correction of the prediction model is necessary.

9. A processing method executed by a computer, the method comprising:

acquiring remaining-fuel-amount prediction information indicating a change in a predicted value of a remaining amount of fuel in a vehicle while traveling based on a transport plan is performed and being produced based on a prediction model;

acquiring remaining-fuel-amount actual measurement information indicating a change in an actual measurement value of a remaining amount of fuel in the vehicle while traveling based on the transport plan is performed;

acquiring a sensor value being a value indicating a state of the vehicle while traveling based on the transport plan is performed and being measured by a sensor installed in the vehicle;

determining, based on the remaining-fuel-amount prediction information and the remaining-fuel-amount actual measurement information and based on a comparison result between the sensor value and a reference value, whether correction of the prediction model is necessary; and in response to a determination that a correction of the prediction model is necessary, correcting the prediction model, wherein the prediction model is a machine learning model trained on at least one explanatory variable, the sensor value is a value relating to operation of a driver, the reference value indicates a value during normal operation, and determining that correction of the prediction model is necessary in a case where the remaining-fuel-amount prediction information and the remaining-fuel-amount actual measurement information deviate from each other by equal to or more than a first criterion level, and the sensor value and the reference value do not deviate from each other more than a third criterion level.

10. The processing method according to claim 9, wherein a remaining amount of fuel in the vehicle is indicated by state of charge (SOC).

11. The processing method according to claim 9, wherein the computer acquires a parameter plan value being a value of each of various parameters used for production of the remaining-fuel-amount prediction information and being a value planned based on the transport plan, acquires a parameter actual result value being an actual result value of each of the various parameters while traveling based on the transport plan is performed, and determines, further based on a comparison result between the parameter plan value and the parameter actual result value, whether correction of the prediction model is necessary.

12. The processing method according to claim 11, wherein the computer determines that correction of the prediction model is necessary in a case where the remaining-fuel-amount prediction information and the remaining-fuel-amount actual measurement information deviate from each other by equal to or more than a first criterion level, and the parameter plan value and the parameter actual result value do not deviate from each other more than a second criterion level.

13. A non-transitory storage medium storing a program causing a computer to:

acquire remaining-fuel-amount prediction information indicating a change in a predicted value of a remaining amount of fuel in a vehicle while traveling based on a transport plan is performed and being produced based on a prediction model;

acquire remaining-fuel-amount actual measurement information indicating a change in an actual measurement value of a remaining amount of fuel in the vehicle while traveling based on the transport plan is performed;

acquire a sensor value being a value indicating a state of the vehicle while traveling based on the transport plan is performed and being measured by a sensor installed in the vehicle;

determine, based on the remaining-fuel-amount prediction information and the remaining-fuel-amount actual measurement information and based on a comparison result between the sensor value and a reference value, whether correction of the prediction model is necessary; and in response to a determination that a correction of the prediction model is necessary. correct the prediction model, wherein the prediction model is a machine learning model trained on at least one explanatory variable, the sensor value is a value relating to operation of a driver, the reference value indicates a value during normal operation, and determining that correction of the prediction model is necessary in a case where the remaining-fuel-amount prediction information and the remaining-fuel-amount actual measurement information deviate from each other by equal to or more than a first criterion level, and the sensor value and the reference value do not deviate from each other more than a third criterion level.

14. The non-transitory storage medium according to claim 13, wherein a remaining amount of fuel in the vehicle is indicated by state of charge (SOC).

15. The non-transitory storage medium according to claim 13, wherein the program causing the computer to acquire a parameter plan value being a value of each of various parameters used for production of the remaining-fuel-amount prediction information and being a value planned based on the transport plan, acquire a parameter actual result value being an actual result value of each of the various parameters while traveling based on the transport plan is performed, and determine, further based on a comparison result between the parameter plan value and the parameter actual result value, whether correction of the prediction model is necessary.

16. The non-transitory storage medium according to claim 15, wherein the program causing the computer to determine that correction of the prediction model is necessary in a case where the remaining-fuel-amount prediction information and the remaining-fuel-amount actual measurement information deviate from each other by equal to or more than a first criterion level, and the parameter plan value and the parameter actual result value do not deviate from each other more than a second criterion level.

* * * * *